US006970856B1

(12) United States Patent
Heiden et al.

(10) Patent No.: US 6,970,856 B1
(45) Date of Patent: Nov. 29, 2005

(54) POSTAGE PRINTING SYSTEM HAVING SUBSIDIZED PRINTING OF THIRD PARTY MESSAGES

(75) Inventors: Richard W. Heiden, Huntington, CT (US); Steven M. Kaye, Weston, CT (US); Jeffrey D. Pierce, Norwalk, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/550,878

(22) Filed: Apr. 17, 2000

Related U.S. Application Data

(63) Continuation of application No. 09/224,256, filed on Dec. 30, 1998, now Pat. No. 6,141,654.

(51) Int. Cl.[7] .............................................. G06F 17/00
(52) U.S. Cl. .................................................... 705/408
(58) Field of Search ............................... 705/408, 401, 705/14, 410, 34, 35, 40, 407; 235/375

(56) References Cited

U.S. PATENT DOCUMENTS

| | | | | |
|---|---|---|---|---|
| 4,639,873 | A | 1/1987 | Baggarly et al. | 364/465 |
| 4,725,718 | A | 2/1988 | Sansone et al. | 235/495 |
| 4,734,865 | A | 3/1988 | Scullion et al. | 364/478 |
| 4,797,830 | A | 1/1989 | Baggarly et al. | 364/464.03 |
| 4,831,554 | A | 5/1989 | Storace et al. | 364/519 |
| 4,873,645 | A | 10/1989 | Hunter et al. | 364/479 |
| 4,959,795 | A | 9/1990 | Christensen et al. | 364/464.03 |
| 5,008,827 | A | 4/1991 | Sansone et al. | 364/464.02 |
| 5,024,153 | A | 6/1991 | Bannister et al. | 101/91 |
| 5,043,908 | A | 8/1991 | Manduley et al. | 364/478 |
| 5,058,030 | A | 10/1991 | Schumacher | 364/478 |
| 5,072,400 | A | 12/1991 | Manduley | 364/478 |
| 5,168,804 | A | 12/1992 | Lee et al. | 101/99 |
| 5,177,687 | A | 1/1993 | Baggarly et al. | 364/464.03 |
| 5,454,038 | A | 9/1995 | Cordery et al. | 380/23 |
| 5,490,077 | A | 2/1996 | Freytag | 364/464.02 |
| 5,509,109 | A | 4/1996 | Kim et al. | 395/114 |

(Continued)

FOREIGN PATENT DOCUMENTS

EP 000933730 A2 * 8/1999

(Continued)

OTHER PUBLICATIONS

Derwent = ACC NO: 2000-629491; Heiden, R. W. et al.*

(Continued)

*Primary Examiner*—Pierre Eddy Elisca
(74) *Attorney, Agent, or Firm*—Angelo N. Chaclas; George M. Macdonald

(57) ABSTRACT

A postage printing system, having a computer, a data center and a control system. The computer is in operative communication with a printer for printing a postal indicia on an envelope. The data center is in operative communication with the computer which in turn is located remotely from the data center. The data center includes a plurality of user accounts and a plurality of advertiser accounts where each of the plurality of advertiser accounts includes respective ad data including message data and restriction data. The control system is in operative communication with the data center and the computer and is for: (i) establishing a transaction session between a user of the computer corresponding to one of the plurality of user accounts and the data center; (ii) obtaining recipient address information from the user; and (iii) using the recipient address information and the restriction data from the plurality of advertiser accounts to identify message data available for printing on the envelope in conjunction with the postal indicia.

7 Claims, 4 Drawing Sheets

U.S. PATENT DOCUMENTS

| | | | | |
|---|---|---|---|---|
| 5,579,449 | A | 11/1996 | Strobel | 395/110 |
| 5,761,648 | A | 6/1998 | Golden et al. | 705/14 |
| 5,819,241 | A | 10/1998 | Reiter | 705/408 |
| 5,822,739 | A | 10/1998 | Kara | 705/410 |
| 5,948,061 | A | 9/1999 | Merriman et al. | 709/219 |
| 6,141,654 | A * | 10/2000 | Heiden et al. | 705/408 |
| 6,154,733 | A * | 11/2000 | Pierce et al. | 705/408 |
| 6,173,274 | B1 * | 1/2001 | Ryan, Jr. | 705/408 |
| 6,321,210 | B1 * | 11/2001 | O'Brien et al. | 705/14 |
| 2001/0023408 | A1 | 9/2001 | McEvoy et al. | 705/14 |

FOREIGN PATENT DOCUMENTS

| | | | |
|---|---|---|---|
| JP | 410258844 | A * | 9/1998 |

OTHER PUBLICATIONS

IBM Technical Disclosure Bulletin; Oct. 1, 1994; Postal Scale with speech recognition Feature.*

* cited by examiner

POSTAGE PRINTING SYSTEM HAVING SUBSIDIZED PRINTING OF THIRD PARTY MESSAGES

CROSS REFERENCE TO RELATED APPLICATIONS

This application is a continuation of U.S. patent application Ser. No. 09/224,256 filed on Dec. 30, 1998 now U.S. Pat. No. 6,141,654, entitled POSTAGE PRINTING SYSTEM HAVING SUBSIDIZED PRINTING OF THIRD PARTY MESSAGES.

FIELD OF THE INVENTION

This invention relates generally to postage printing systems. More particularly, this invention is directed to a postage printing system including subsidies for printing of third party messages.

BACKGROUND OF THE INVENTION

Postage printing systems are well known in the art. A typical postage meter (one example of a postage printing system) applies evidence of postage, commonly referred to as a postal indicia, to an envelope or other mailpiece and accounts for the value of the postage dispensed. As is well known, postage meters include an ascending register, that stores a running total of all postage dispensed by the meter, and a descending register, that holds the remaining amount of postage credited to the meter and that is reduced by the amount of postage dispensed during a transaction. The postage meter generally also includes a control sum register which provides a check upon the descending and ascending registers. The control sum register has a running account of the total funds being added into the meter. The control sum register must always correspond with the summed readings of the ascending and descending registers. The control sum register is the total amount of postage ever put into the machine and it is alterable only when adding funds to the meter. In this manner, by inspecting the various registers and securing them from tampering, the dispensing of postal funds may be accurately recorded, tracked and accounted for.

More recently, a postage printing system has been developed where the accounting structure described above is no longer resident with the user. Sometimes referred to as a "virtual postage meter", these types of postage printing systems dispense postage electronically over suitable communication channels (LAN, WAN, telephone lines, Internet, etc.). The user maintains an account with a remotely located data center (maintained by an authorized postage meter manufacturer) and receives postage securely using appropriate electronic data interchange techniques. At a later time, the user is invoiced for the amount of postage dispensed and any other fees associated with maintaining the account with the data center. Oftentimes, a secret code or token is derived from information particular to the mailpiece (the indicated postage amount, date, recipient address information, etc.) and is incorporated or embedded into the postal indicia for later use by a postal authority in verifying the integrity of the postal indicia. Examples of such systems are described in U.S. Pat. No. 4,725,718 and U.S. Pat. No. 5,454,038.

It is also known to print selected messages (sometimes referred to as ad slogans although such messages are not restricted to advertisements) along with the postal indicia. Generally, the message bears no relation to the postal indicia. In traditional postage meters employing either rotary drum or flat bed printing technology, the message was printed along with the postal indicia by including an additional printing die representative of the message. These dies were typically costly to manufacture and distribute and cumbersome for the postage meter user to install. Examples of die based systems for printing messages are disclosed in U.S. Pat. No. 5,168,804 and U.S. Pat. No. 5,024,153. More recently, the postage meter industry has begun to incorporate digital (dot matrix) printing technology which obviates the need for dies as the digital printer may be supplied with suitable drive signals to effect printing of the message. Examples of digital printing technology based systems for printing messages are disclosed in U.S. Pat. No. 4,831,554 and U.S. Pat. No. 5,509,109.

Additionally, U.S. Pat. No. 4,831,554 teaches a system that allows the postage meter manufacturer to broker the use of advertising space by third parties on the envelopes. In concept, a third party advertiser may wish to take advantage of the space on the outgoing envelopes from a particular postage meter user to advertise its own products and/or services. In this system, a message, the content of which originates from a third party, is stored electronically within the postage meter. The postage meter keeps a count of the number of times that the message is printed in conjunction with the postal indicia. This count is then used by the data center to provide a subsidy to the postage meter user during a subsequent billing cycle and is correspondingly also used by the data center to invoice the third party advertiser.

Although this brokering system represents a new business opportunity for postage meter manufacturers, it suffers from certain drawbacks and disadvantages. First, the third party advertiser cannot exercise any control over when the message is dispensed. Thus, if the message is time sensitive, then the relevance of the message may be lost after a certain date and the third party advertiser would be compelled to pay for advertising that was not effective. For example, advertisements directed to promotions that have expiration dates (rebate programs, concert tickets, limited time offers, etc.) are useless once the relevant time period has passed. Second, the third party advertiser cannot exercise any control over the number of messages dispensed. Thus, if the third party advertiser allocated a fixed advertising budget and accordingly only wanted to pay for a limited number envelopes containing the message, then the third party advertiser may be compelled to pay for advertising that was not wanted if the postage meter user generates increased mail volume over that which was anticipated. Third, the third party advertiser cannot exercise any control over the recipient of the message. Thus, the third party advertiser has no assurance that a target audience would be reached. For example, advertisements (e.g. sports related or hair loss, as examples) intended primarily for males may not be relevant if the recipient of the envelope from the postage meter user was a female. Fourth, the third party advertiser cannot exercise any control over the geographic reach of the message. Here again, the third party advertiser has no assurance that the target audience would be reached. For example, advertisements (e.g. local car dealership or cleaning service, as examples) intended for a certain limited geographic region would not be relevant if the recipient of the envelope from the postage meter user was located many miles away from the certain limited geographic region. As a related example, advertisements intended for the certain limited geographic region on envelopes originating from outside of the certain limited geographic region would not benefit from the increased good will of being associated with a sender in the certain limited geographic region.

As described above, the effectiveness of the third party messages printed on envelopes is low. Because of the above drawbacks and disadvantages, the fees that third party advertisers would be willing to pay the postage meter manufacturer are relatively low. In turn, the subsidies that the postage meter manufacturer are able to pass along to the postage meter user are correspondingly relatively low. Thus, in the absence of a meaningful economic incentive there is little motivation for third party advertisers and postage meter users to participate in the above described system for placing third party advertising on envelopes.

Therefore, there is a need for an improved system that allows the postage meter manufacturer to broker the use of advertising space by third parties on envelopes. More particularly, there is a need for a system that places the messages on envelopes in a more effective manner so that third party advertisers are more likely to reach their target audiences. In this manner, the third party advertisers would be willing to pay higher fees resulting in an increased economic incentive for third party advertisers and postage meter users to participate.

SUMMARY OF THE INVENTION

The present invention provides a system and methods for improving the effectiveness of third party advertising on envelopes. Generally, this is accomplished by letting the third party advertisers establish restrictions or limits on the envelopes that they would like to place their messages on. The restrictions may be based upon user (sender) parameters, recipient parameters, quantitative parameters (time, piece count, etc.) or some combination of the above.

In accordance with the present invention, there is provided a postage printing system comprising a computer, a data center and a control system. The computer is in operative communication with a printer for printing a postal indicia on an envelope. The data center is in operative communication with the computer which in turn is located remotely from the data center. The data center includes a plurality of user accounts and a plurality of advertiser accounts where each of the plurality of advertiser accounts includes respective ad data including message data and restriction data limiting the use of the message data. The control system is in operative communication with the data center and the computer and is for: (i) establishing a transaction session between a user of the computer corresponding to one of the plurality of user accounts and the data center; (ii) obtaining recipient address information from the user; and (iii) using the recipient address information and the restriction data from the plurality of advertiser accounts to identify message data available for printing on the envelope in conjunction with the postal indicia.

In accordance with the present invention, a method of operating a postage printing system and a method of operating a data center are also provided.

Therefore, it is now apparent that the present invention substantially overcomes the disadvantages associated with the prior art. Additional advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
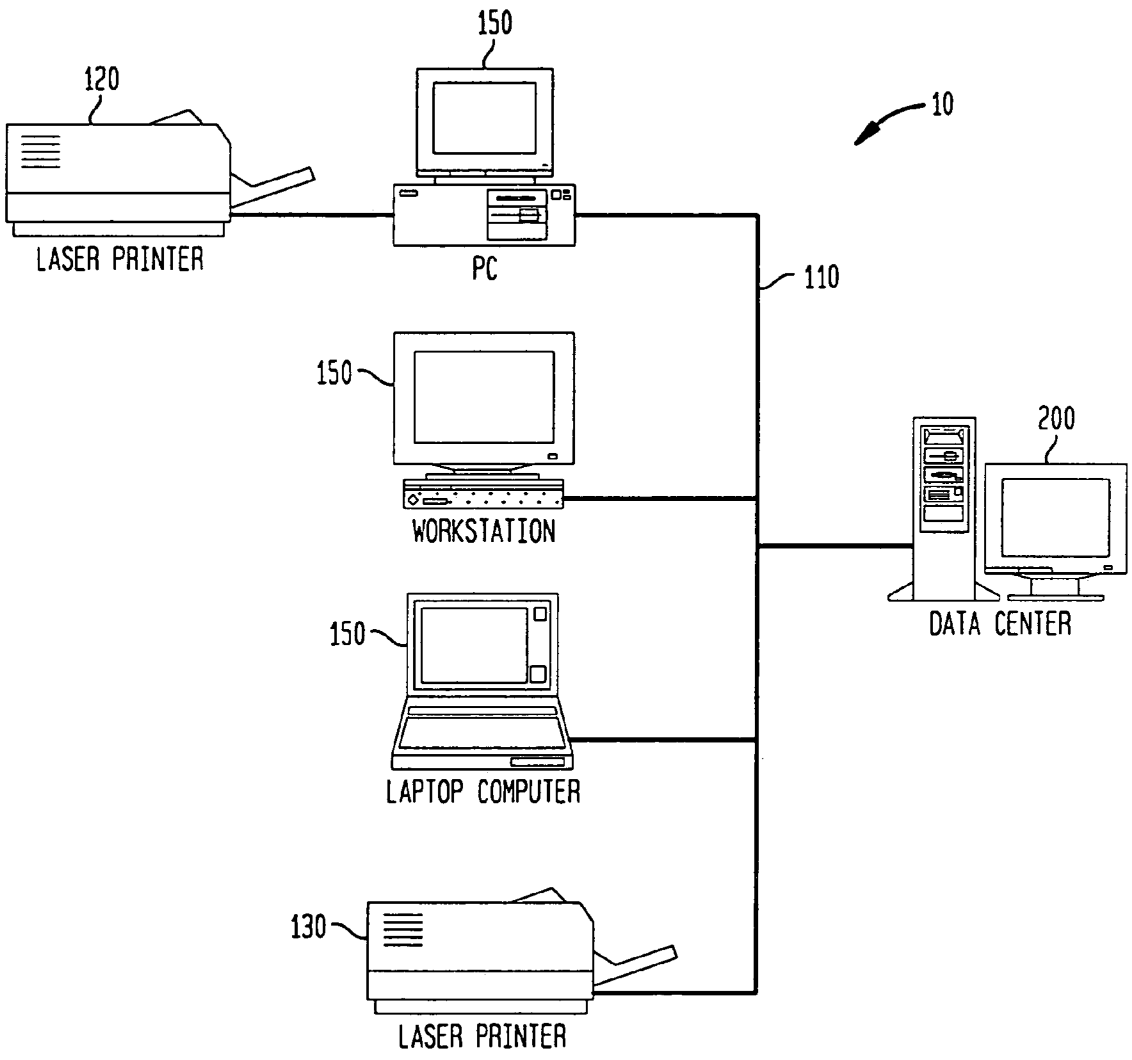
FIG. 1 is a simplified representation of a postage printing system including a data center and a plurality of remotely located computer systems in electronic communication with the data center in which the present invention may be incorporated.

Referring to FIG. 1, an example of a postage printing system 10 indicative of one example of a virtual postage metering environment in which the present invention may be incorporated is shown. Generally, the postage printing system 10 includes a data center 200 in communication over any suitable communication network 110 (LAN, WAN, telephone line, internet, etc.) with a plurality of remotely located computers (personal computer, workstation, laptop computer or the like) 150. Generally, it is anticipated that the computers 150 would be located in small business offices and/or in private residences and used for a variety of purposes including obtaining postage. The data center 200 is maintained and operated by an authorized postage meter manufacturer or some other authorized agency. The computers 150 may be connected directly to a printer 120 or have access to a printer 130 over the suitable communication network 110. Those skilled in the art will recognize that not each computer 150 need utilize the same network 110 in contacting the data center 200. Likewise, the computer 150 may use one type of network 110 with the data center 200 and a different type of network with the printer 130. The remotely located computers 150 are representative of users wanting to obtain postage for their mailpieces (envelopes, post cards, packages and the like).

Figure 2:
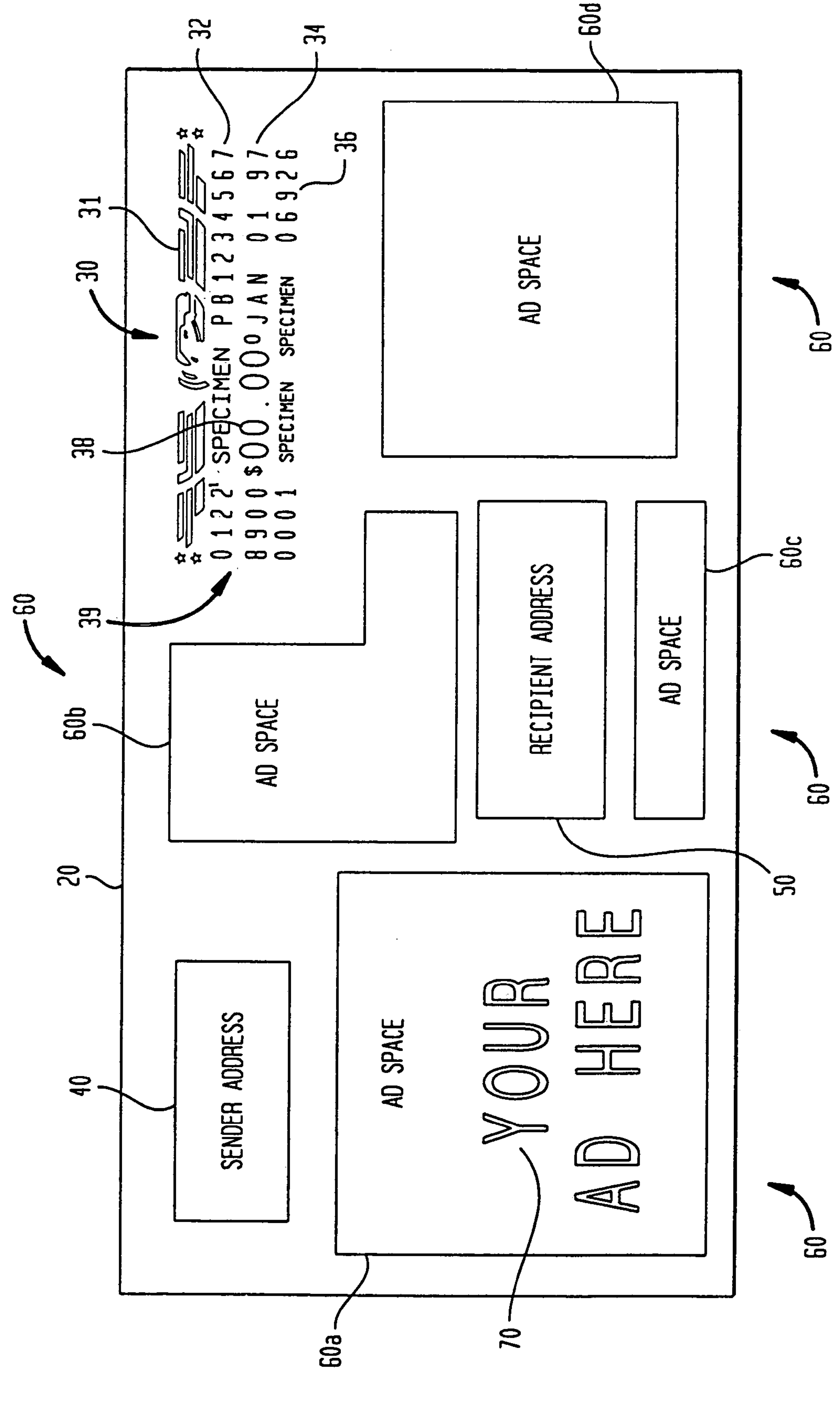
FIG. 2 is a front view of an envelope that has been processed by the postage printing system in accordance with the present invention.

Referring to FIG. 2, an envelope 20 having an example of a postal indicia 30, a sender address 40 and a recipient address 50 printed thereon is shown. The postal indicia 30 includes both fixed data that does not change from postal indicia to postal indicia and variable data that may change from postal indicia to postal indicia. Generally, the fixed data includes a graphic design 31 (an eagle with stars), a meter serial number 32 uniquely identifying the postage meter (not shown) that dispensed the postage and a licensing or receiving post office identifier (zip code) 36. Generally, the variable data includes a date 34 indicating when the postage was dispensed, a postal value 38 indicating an amount of postage and other data 39 for use by the postal authority in verifying the authenticity of the postal indicia 30 using conventional techniques. However, those skilled in the art will recognize that the exact content of both the fixed data and variable data is subject to regulation by the postal authority and a matter of design choice. For example, in a virtual meter environment the meter serial number 32 may not be used and the receiving post office identifier (zip code) 36 may be variable data. Moreover, any format (numeric, alpha-numeric, bar code, other symbology and the like) may be employed for the verification data 39.

The further details of the envelope 20 will now be described. In conventional fashion, the postage meter user may optionally place a sender or return address 40 in the upper left hand corner of the envelope 20. As examples, the sender address 40 may be preprinted on the envelope 20, printed on an adhesive label and affixed to the envelope 20 or printed concurrently with the postal indicia 30 by the printer 120. The recipient address 50 represents the delivery point for the envelope 20. A further detailed description of the printing of the recipient address 50 and the relationship of the recipient address 50 to the postal indicia 30 will be provided below. The remainder of the envelope 20 that is not occupied by the postal indicia 30, the sender address 40 and the recipient address 50 is available as advertising space 60 made up of a plurality of ad zones 60*a*, 60*b*, 60*c* and 60*d*. The advertising space 60 may contain one or more messages from third party advertisers.

Figure 3:
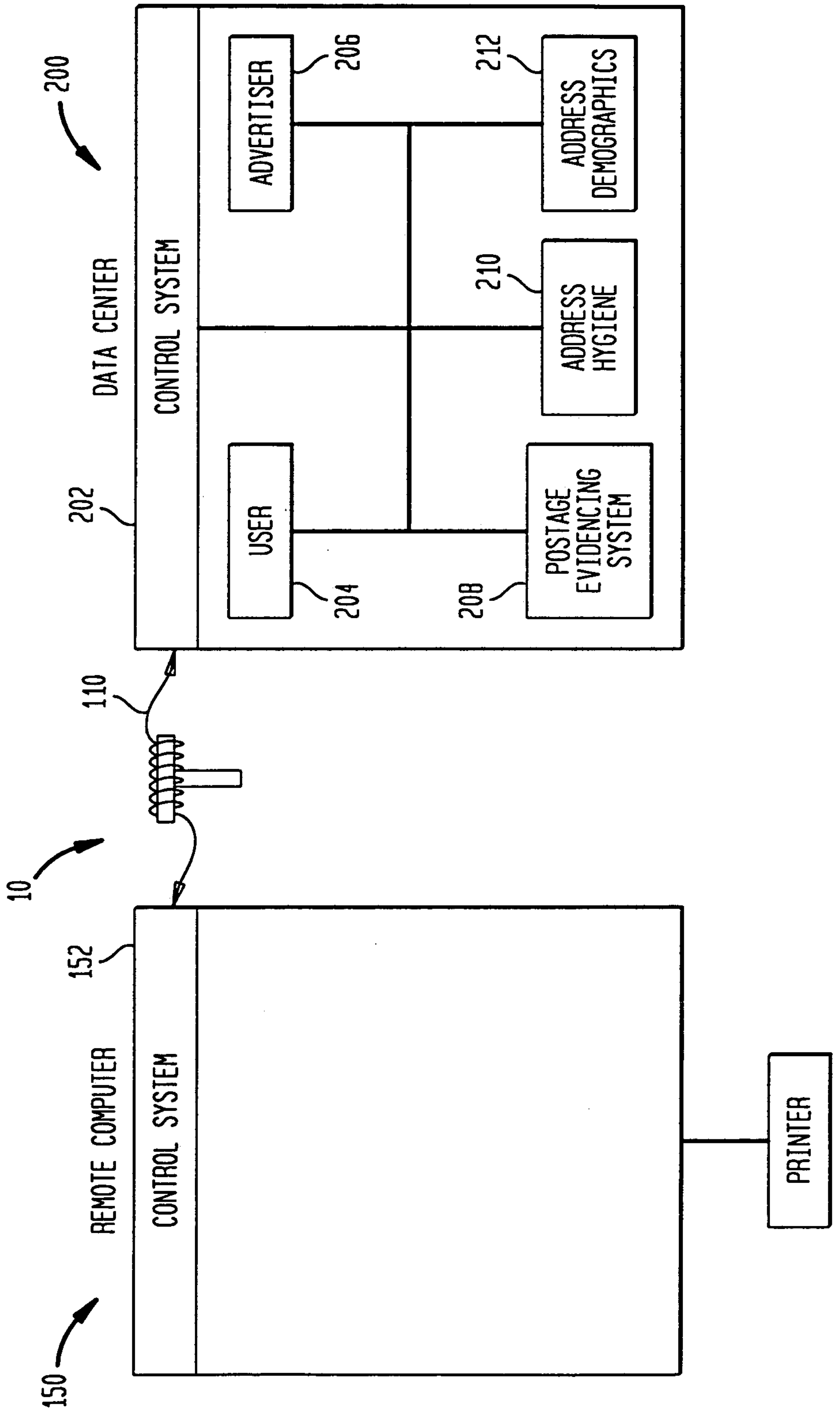
FIG. 3 is a more detailed representation of the postage printing system in accordance with the present invention.

Referring to FIG. 3, a more detailed schematic of the postage printing system 10 of the present invention is shown. The remote computer 150 includes a control system 152 that is in communication over a suitable communication network 110, such as: telephone lines, public and private network systems (Internet) or the like; with a control system 202 from the data center 200. The data center 200 may be based on any conventional computer based platform (PC, server, workstation, mainframe or the like) and includes the control system 202, a user database 204, an advertiser database 206, a postage evidencing system 208, an address hygiene database 210 and an address demographics database 212, all of which are in operative communication with each other over using conventional means. The user database 204 contains information concerning individual user accounts, such as: user name, user address, preferred payment vehicle or arrangements (periodic invoice, direct credit card authorization, electronic funds transfer, etc.), and the like, that have been established with the postage meter manufacturer. Similarly, the advertiser database 206 contains information concerning individual advertiser accounts, such as: advertiser name, advertiser address, preferred payment vehicle or arrangements (periodic invoice, direct credit card authorization, electronic funds transfer, etc.), ad data and the like, that have been established with the postage meter manufacturer. The address hygiene database 210 may employ any suitable database for use in cleansing submitted addresses to ensure that they are complete and correct, such as the Address Matching System (AMS) available from the United States Postal Service, Cross Check™ software system available from Pitney Bowes Inc. of Stamford, Conn. or any other commercially available system for cleansing addresses. The address demographics database 212 may employ any suitable database containing statistics relevant to certain geographic locations. As examples, various databases exist that contain detailed demographic information by zip code, such as: PRIZM available from Claritas Inc. (see Internet URL www.claritas.com), United States census information or any other database that is generally known and commercially available.

The postage evidencing system 208 accurately records, tracks and accounts for the postal funds that are dispensed to the remote computer 150. In the preferred environment, the postage evidencing system 208 includes one or postage meters or postal security devices (PSD). That is, the data center 200 may buy postage in advance from postal authority and store it in the postage meter in conventional fashion. Thus, the data center 200 may establish one postage meter per account or multiple accounts per postage meter. In either event, the postage meter manufacturer takes care of obtaining, recharging and inspecting the postage meter as required by the postal authority. On the other hand, the postage evidencing system 208 may not include a postage meter. As a trusted third party to the postal authority, the postage meter manufacturer may merely be allowed to forward a payment to the postal authority on a regular basis indicative of the amount of postage dispensed. In yet another alternative, the postal authority may operate the data center 200 itself.

Figure 4:
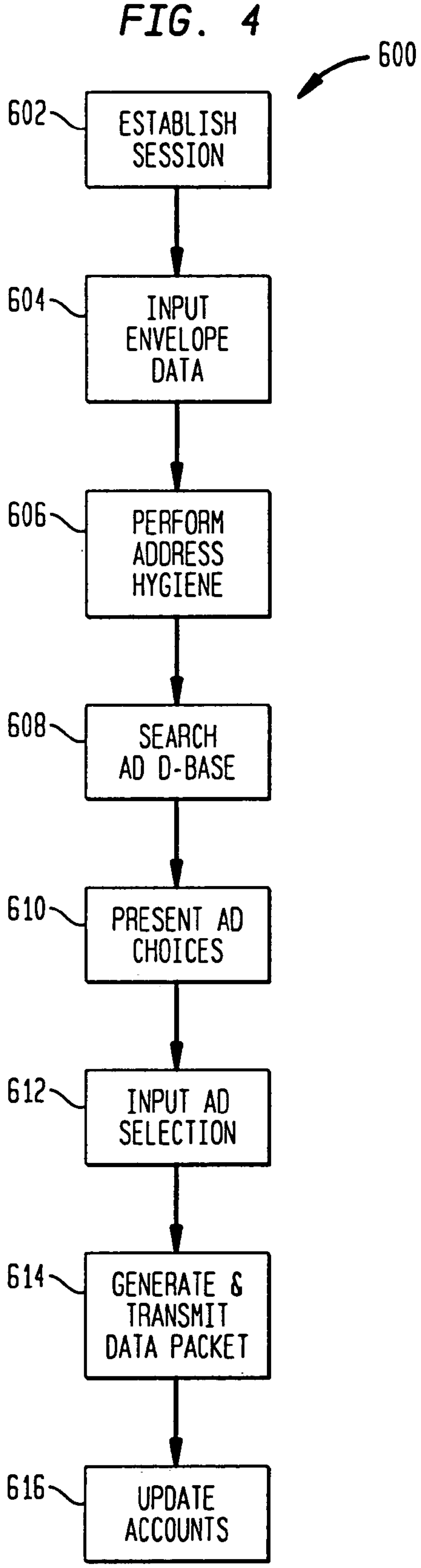
FIG. 4 is a flow chart showing the operation of the postage printing system in accordance with the present invention.

With the structure of the postage printing system 10 described as above, the operational characteristics will now be described with respect to a typical transaction conducted between the remote computer 150 and the data center 200. Referring primarily to FIG. 4 while referencing the structure of FIGS. 1, 2 and 3, a flow chart of a transaction routine 600 in accordance with the present invention is shown. The diagnostic routine 600 may be comprised of any suitable combination of software, firmware and hardware subsystems executed by the remote computer control system 152 and the data center control system 202. Generally, the activities of the data center 200 are such that they may be fully automated. On the other hand, the remote computer 150 includes a suitable user interface (CRT w/keyboard having menu driven functionality) for communicating with the user. For the sake of clarity and brevity, it is assumed that the user maintains a valid account with the data center 200. It is also assumed that the user desires to include third party advertising on envelopes.

At 602, the transaction routine 600 commences when the remote computer 150 contacts the data center 200 to establish a session for the purpose of obtaining postage. In this manner, the remote computer 150 and the data center 200 recognize each other as authentic using any conventional mutual authentication technique. This generally involves the user of the remote computer 150 transmitting a valid account number or other identifying information and a corresponding password. In this manner, postage is not inadvertently supplied to one party while a second party is invoiced for the postage. Once the session has been established, at 604, the data center 200 obtains relevant data necessary to produce the postal indicia 30 for the envelope 20. This typically involves the user transmitting a desired postage amount and a recipient address 50 to the data center 200. Preferably, this is accomplished by having the user enter appropriate data fields (postage amount, 3 or 4 line address block, etc.) in a menu screen prior to uploading to the data center 200. Alternatively, the address information may be retrieved from a word processing document such as a letter. Next, at 606, the data center 200 performs address hygiene. Although address hygiene is not required, the results of the message selection will likely be improved with the cleansed addresses. The recipient address 50 received from the user is compared against the address hygiene database 210. At this time, any misspelled words are corrected and any missing information (zip code or zip +4) is filled in from the address hygiene database 210 to yield a hygiened or corrected recipient address 50. If the data center 200 cannot verify the integrity of the recipient address 50 received from the user, then the user may be instructed to check the recipient address 50 and resubmit it.

Figure 5:
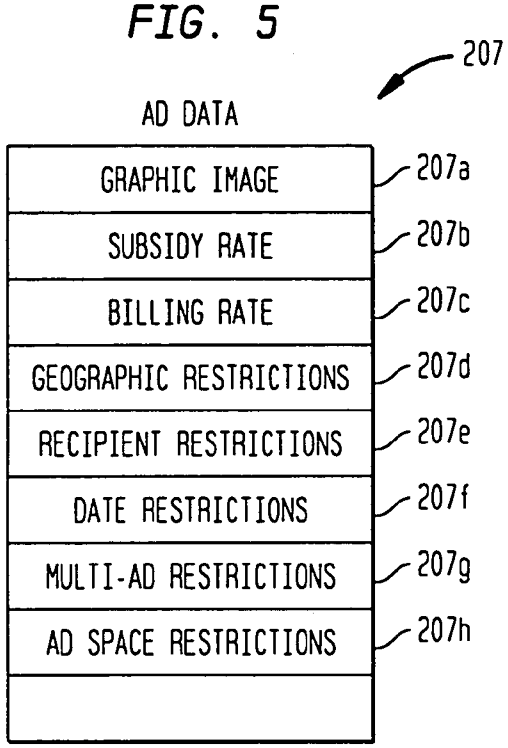
FIG. 5 is a schematic representation of an ad data file associated with a third party message to be printed on the envelope by the postage printing system in accordance with the present invention.

Next, at 608, the data center 200 searches the third party advertiser database 206 for those advertisers that are interested in advertising on the envelope 20 associated with the hygiened recipient address 50. For the reasons discussed above, not every third party advertiser may want to advertise on every envelope 20. Generally, this step involves establishing an ad data profile for each advertisement and comparing the hygiened recipient address 50 to the ad data profile. Referring to FIG. 5, a schematic representation of an ad data profile file 207 associated with a third party message to be printed on the envelope 20 by the postage printing system 10 is shown. The ad data includes: graphic image data 207*a*; a subsidy rate data 207*b*; a billing rate 207*c* and restriction data. The restriction data may include sender restriction data, addressee restriction data and non-addressee (quantitative) restriction data, or any combination of types of restriction data. Preferably, the addressee restriction data includes: geographic restriction data 207*d* and recipient restriction data 207*e*. Preferably, the non-addressee restriction data includes: date restriction data 207*f*; multi-ad restriction data 207*g*; and ad space restriction data 207*g*. Piece count restriction data and budget limit data defining a maximum amount of advertising charges for a given time period may also be included in the non-addressee restriction data. The graphic image data 207*a* is representative of the desired message and may be stored in any manner of well known formats, such as: PDF, JPEG, GIF and the like. The subsidy rate data 207*b* includes information corresponding to the credit value that will be applied to the user's account for authorizing printing of the third party message on the envelope 20. The billing rate data 207*c* includes information corresponding to the debit value that will be applied to the third party advertiser's account in conjunction with printing of the third party message on the envelope 20. The geographic restriction data 207*d* provides an indication of what geographic areas the third party advertiser wants to target. This may be manifested by a restriction on the originating location or the destination location or preferably both. The recipient restriction data 207*e* provides an indication of the target audience. For example, distinctions may be made between a commercial and a residential address. In the preferred embodiment, the commercial versus residential distinction may be obtained directly from the user or from the Address Matching System. Alternatively, this may also be accomplished by interrogating the hygiened recipient address 50 for certain "key words" indicative of company, such as: inc., incorporated, co., company and the like. As another example that may be used independent from or in combination with the example previously discuss, the address demographics database 212 allows further targeting of messages. Generally, income, age and other demographic statistics are available for different regions of the country. Thus, the delivery point zip code in the hygiened recipient address 50 may be cross referenced to the address demographics database 212 and the resulting demographic statistics compared with the third party advertiser's requirements. For example, a luxury car manufacturer may only want its ads going to private residences from regions where the average income is above a predetermined threshold. The date restriction data 207*f* provides an indication of what dates the third party advertiser wants to advertise on. For example, expiration dates could be established beyond which the message will not be dispensed. As another example, periodic cycles ($1^{st}$ week of month, last week of month, on Mondays, 2 weeks before a holiday, etc.) could be established during which the message is available for printing. The multi-ad restriction data 207*g* provides an indication of whether or not the third party advertiser allows another third party advertiser to occupy to advertise on the envelope 20. The sentiment being that a multiplicity of messages will dilute the effectiveness of the individual messages versus if the individual messages were used singularly. If the third party advertiser allows other advertisers, then a reduced credit indicated in the subsidy rate data 207*b* and a reduced debit indicated in the billing rate data 207*c* may be applied when multiple messages are employed. The ad space restriction data 207*h* provides an indication of which ad zones 60*a*, 60*b*, 60*c* and 60*d* the third party advertiser authorizes for use with the message. Thus, the third party advertiser may exercise some control over where on the envelope 20 the message is printed. Similarly, as an option, the user may also provide an indication of which ad zones 60*a*, 60*b*, 60*c* and 60*d* the message may be printed in. For example, the user may be using an envelope 20 with preprinted images already occupying a portion of one or more ad zones 60*a*, 60*b*, 60*c* and 60*d*. In this scenario, the ad space restriction data 207*h* and the user's input must be reconciled. Those skilled in the art will recognize that the above described restriction data 207*d*, 207*e*, 207*f*, 207*g* and 207*h* may be utilized independently from each other or in any desired combination. Still other restrictions may be utilized, such as piece count limits. It should now be apparent that the messages that meet the restriction criteria and are available for printing represent a subset of the total number of messages that are potentially available.

Again referring primarily to FIG. 4 while referencing the structure of FIGS. 1, 2, 3 and 5, once the available messages are determined according to the restriction data described above, at 610, the relevant messages and their corresponding subsidy rate 207*b* are presented to the user on the remote computer 150 via the user interface. This provides the user with the opportunity to view and analysis the available messages along with their corresponding subsidy rate 207*b*. Next, at 612, the user selects a message for printing on the envelope 20 in conjunction with the postal indicia 30. For the sake of clarity and brevity, it will be assumed that only one (1) message 70 is selected for printing in ad space zone 60*a*. However, those skilled in the art will recognize that, as described above, multiple messages may be printed. Next, at 614, the data center 200 generates a print data packet to be downloaded to the remote computer 150 for use in printing the postal indicia 30 and the selected message 70. Preferably, the print data packet contains only information corresponding to the variable data portion of the postal indicia 30. In this embodiment, the remote computer 150 assembles the variable data with the fixed data which has been previously stored on the remote computer 150 to create a complete postal indicia 30. The print data packet also contains graphic information necessary to print the selected message 70. Once the data packet has been received, the user can feed the envelope 20 through the printer 130 to effect printing. Next, at 616, the data center 200 updates the user account to reflect the transaction information, such as: the date, the postage amount dispensed, the hygiened address 50, the selected message 70, the corresponding subsidy, any fees associated with providing the above described services and any other relevant data. Similarly, the data center 200 updates the selected third party advertiser's account to reflect the transaction information, such as: the date, the selected message 70, the corresponding advertising fee, any additional fees associated with providing the above described services and any other relevant data. At a later time, the data center 200 exercises the preferred payment vehicle for the user and the selected third party advertiser, respectively.

Base on the above description and the associated drawings, it should now be apparent that the present invention improves the ability of third party advertisers more efficiently reach their target audience through advertising on envelopes.

Many features of the preferred embodiment represent design choices selected to best exploit the inventive concept as implemented in a particular virtual postage meter environment. However, those skilled in the art will recognize that various modifications can be made without departing from the spirit of the present invention. For example, the address hygiene database 210 and the third party advertiser database 206 may be resident at the remote computer 150. Thus, a portion of the functionality of the data center 200 described above would be off loaded to the remote computer 150. The remote computers 150 could then periodically receive updated information concerning the address hygiene database 210 and the third party advertiser database 206 by any conventional means. Thus, those skilled in the art will recognize that there are many ways to distribute the functionality described above between the data center 200 and the remote computer 150. As yet another example, different billing rates may be applied for multi-color versus mono-color printing capability. Thus, user's with multi-color printers may be offered higher subsidies.

As another example, the selected message 70 and the postal indicia 30 need not be printed at the same time. The postal indicia 30 may be printed first, by a closed system postage meter for example, and then scanned for uploading to the data center 200 where the message selection process occurs.

Therefore, the inventive concept in its broader aspects is not limited to the specific details of the preferred embodiments described above, but is defined by the appended claims and their equivalents.

What is claimed is:

1. A postage metering system, comprising:

a printing system including a printer for printing on an item intended for a recipient located at a remote location;

a data center in operative communication with the printing system, the printing system being located remotely from the data center, the data center including a plurality of advertiser accounts, each of the plurality of advertiser accounts including respective message data representative of a message;

a control system in operative communication with the data center and the printing system for:

obtaining recipient information; and using the recipient information to identify a subset of messages available for printing on the item.

2. The system of claim 1, wherein:

the control system is further for:

receiving from a user an indication of a selected message from the subset of messages that the user authorizes for printing.

3. The system of claim 2, wherein:

the control system is further for:

compensating the user for printing the selected message; and charging the advertiser account corresponding to the selected message for printing the selected message.

4. The system of claim 3, wherein:

each of the plurality of advertiser accounts further includes restriction data; and the control system is further for:

using the recipient information in combination with the restriction data from the plurality of advertiser accounts to identify the subset of messages available for printing.

5. The system of claim 4, wherein:

each of the restriction data, respectively, includes addressee restriction data, including at least information relating to one of the following:

commercial/residential restrictions; demographic restrictions and geographic restrictions, and non-addressee restriction data, including at least information relating to one of the following: piece count restrictions; multi-ad restrictions; date restrictions; ad space zone restrictions and budget restrictions.

6. The system of claim 5, wherein:

the recipient information includes address information obtained from the user.

7. The system of claim 1, wherein:

each of the plurality of advertiser accounts further includes restriction data; and the control system is further for:

using the recipient information in combination with the restriction data from the plurality of advertiser accounts to identify the subset of messages available for printing.

* * * * *